Patented Nov. 15, 1927.

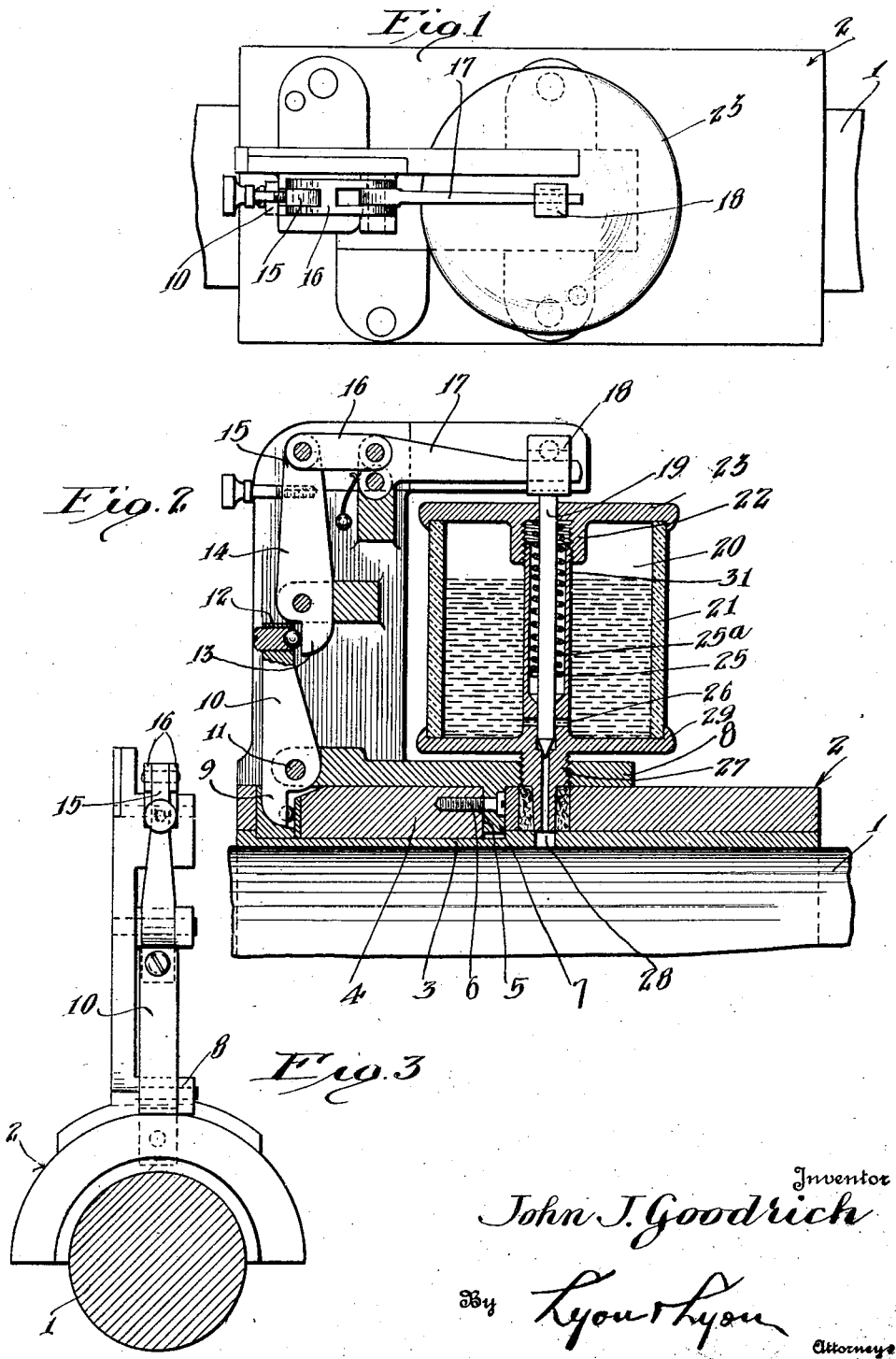

1,649,467

UNITED STATES PATENT OFFICE.

JOHN J. GOODRICH, OF COMPTON, CALIFORNIA.

AUTOMATIC BEARING OILER.

Application filed January 14, 1925. Serial No. 2,272.

This invention relates to a device adapted to automatically supply a lubricant to a bearing, the device being actuated by the development of heat in the bearing to regulate the amount of lubricant supplied thereto.

It is an object of the present invention to provide an automatic device for lubricating a bearing which will require no attention and will supply varying amounts of lubricant to the bearing dependent upon the need of such lubricant as determined from the heating of the bearing. In accordance with the principles of this invention a material adapted to expand when heated is positioned so as to be readily heated by the heat of the bearing to be lubricated, and slidably mounted to permit free expansion of such material, and connections are then made between such heat operated member to actuate a needle valve or other mechanism for controlling the rate of lubricant supplied to the bearing. In this manner a device is provided which will prevent excessive overheating of the bearing and which will economically supply lubricant thereto inasmuch as the lubricant supplied is automatically proportioned according to the necessity of additional lubricant being supplied to the bearing.

Various other objects and advantages of the present invention will be apparent from a description of a preferred form of the device embodying the invention.

For this purpose reference is made to the accompanying drawings, in which the invention is disclosed in its preferred form.

In the drawings:

Figure 1 is a plan view of the lubricating device.

Fig. 2 is an elevation mainly in vertical section; and

Fig. 3 is an elevation at right angles to Fig. 2.

Referring to the drawings, 1 indicates a shaft working in a bearing 2 which it is desired to automatically lubricate in accordance with the need of the lubricant to the bearings, only the upper part of such bearing being illustrated, it being understood that the bearings may be of any desired form or construction. At a point 3 along the bearing 2, the bearing metal is reduced in thickness so as to be radially heat-conductive. Slidably mounted upon such bearing is a heat-responsive member 4 such, for instance, as a strip of zinc or other metal having a relatively large co-efficient of expansion. This heat-responsive member 4 has one end 5 maintained in fixed position in any desired manner, being indicated as held by a screw 6 to a boss 7 of the frame 8 of the device. The opposed end is in engagement with the short arm 9 of a motion amplifying lever 10 pivotally mounted as indicated at 11 to the frame 8. The long arm 12 of the lever 10 in turn engages the short arm 13 of a second pivotally mounted movement amplifying lever 14 which lever 14 in turn has its long arm 15 connected by a link 16 to a third motion amplifying lever 17 engaging a bracket 18 carried by a rod 19 providing a needle valve for a lubricant reservoir 20. The levers 10, 14 and 17, being indicated as arranged to raise and lower the rod 19, as the heat-responsive member 4 expands or contracts, and provide a means for greatly amplifying the movement of the heat-responsive member 4 so as to provide a sensitive adjustment of the needle valve 19.

The needle valve of the rod 19 is shown as vertically reciprocal within the lubricant reservoir 20. The reservoir 20 is formed of a transparent tube 21 resting on a base member 29 and carrying a cover 23. The base member 29 is provided with a sleeve 31 extending around the rod 19, the upper end of which is threaded to a socket 22 extending downward from the cap or cover 23 of the reservoir. The rod or valve 19 carries a pin 25 which is engaged by a spring 25ª enclosed in sleeve 31 and engaging the cover 23 so that the spring 25ª provides a means for yieldingly urging the rod or valve 19 downward into the closed position. The sleeve 31 is provided with a plurality of ports 26 normally maintained closed by the rod 19 which leads from the reservoir by the valve 19 through a threaded stem 27 depending from the base member 29 to a space 28 at the shaft 1 to be lubricated.

The operation of the device is as follows:

The reservoir 20 is filled with a lubricant for the bearing. The device then automatically operates to feed lubricant from the reservoir 20 to the bearing, the lubricant entering at the space 28 adjacent the shaft 1 in accordance with the requirements of the bearing. When the bearing becomes heated over the desirable operating temperature, this heat is conducted to the heat-responsive member 4 which causes the end in engagement with the lever 10 to press against the lever. This motion being amplified through levers 10, 14 and 17, imparts a movement to the needle valve 19, or other lubricant supply controlling means, sufficient to open such means, in accordance with the heat of the bearing, to supply lubricant thereto and lower the temperature of the bearing to the desired working temperature.

While the form of the invention herein illustrated is well suited for accomplishing the purposes of this invention, various modifications may be made in the details of construction without departing from the spirit of the invention. The invention is, therefore, not limited to the specific device shown, but is capable of being embodied in various other forms, all coming within the scope of the appended claims.

I claim:

1. An automatic bearing lubricating device comprising a lubricant holder, means for controlling the flow of lubricant from said holder to the bearing to be lubricated, a heat-sensitive member located with its side against the bearing so as to be heated by heat from said bearing, and means for actuating said controlling means by the linear expansion of said metal body.

2. An automatic lubricating device for a bearing, comprising a metallic heat-sensitive body extending along the bearing with its side against the bearing, fixed at one end, the other end being free to move along the bearing under the action of the linear expansion of the body, a lubricant supply means connected with the bearing, control means for said supply means, and mutually actuating levers connecting said metallic body to said control means, whereby the linear expansion of the body automatically actuates said control means.

3. In a device for automatically controlling the rate of lubricant supplied to a bearing, the combination of a metal body adapted to be fixed at one end and mounted adjacent the bearing, a lubricant supply means, a control means for said supply means, and a plurality of pivotally mounted mutually actuated levers connecting said metal body to said supply means, whereby the linear expansion of the body actuates said control means.

4. In a device for automatically controlling the rate of lubricant supplied to a bearing, the combination of a metal body adapted to be fixed at one end and mounted adjacent a bearing, the metal body having its free end also adjacent the body so that said free end is adapted to move in a direction parallel to the axis of the bearing through the expansion or contraction of the metal body, lubricant supply means, control means for said supply means, and a plurality of pivotally mounted mutually actuated levers connecting said metal body to said supply means, whereby the linear expansion of the body actuates said control means.

Signed at Los Angeles, California, this 7th day of January, 1925.

JOHN J. GOODRICH.